US011640690B2

(12) United States Patent
Garbin et al.

(10) Patent No.: US 11,640,690 B2
(45) Date of Patent: May 2, 2023

(54) HIGH RESOLUTION NEURAL RENDERING

(71) Applicant: MICROSOFT TECHNOLOGY LICENSING, LLC, Redmond, WA (US)

(72) Inventors: Stephan Joachim Garbin, London (GB); Marek Adam Kowalski, Cambridge (GB); Matthew Alastair Johnson, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 78 days.

(21) Appl. No.: 17/321,655

(22) Filed: May 17, 2021

(65) Prior Publication Data

US 2022/0301257 A1   Sep. 22, 2022

Related U.S. Application Data

(60) Provisional application No. 63/162,365, filed on Mar. 17, 2021.

(51) Int. Cl.
| | |
|---|---|
| *G06T 15/06* | (2011.01) |
| *G06T 15/50* | (2011.01) |
| *G06T 15/10* | (2011.01) |
| *G06T 15/08* | (2011.01) |
| *G06N 3/04* | (2023.01) |
| *G06N 3/08* | (2023.01) |
| *G06T 17/20* | (2006.01) |

(52) U.S. Cl.
CPC ........... *G06T 15/10* (2013.01); *G06N 3/0454* (2013.01); *G06N 3/08* (2013.01); *G06T 15/06* (2013.01); *G06T 15/08* (2013.01); *G06T 15/50* (2013.01); *G06T 17/20* (2013.01); *G06T 2210/21* (2013.01)

(58) Field of Classification Search
CPC ........ G06T 15/06; G06T 15/50; G06T 15/506
See application file for complete search history.

(56) References Cited

U.S. PATENT DOCUMENTS

| | | | |
|---|---|---|---|
| 2018/0061086 A1* | 3/2018 | Yoshimura | ................. G06T 7/74 |
| 2020/0226816 A1* | 7/2020 | Kar | .................. H04N 5/232945 |
| 2021/0065440 A1 | 3/2021 | Sunkavalli et al. | |
| 2022/0284657 A1* | 9/2022 | Müller | ...................... G06N 3/04 |
| 2022/0284658 A1* | 9/2022 | Müller | ...................... G06N 3/10 |

OTHER PUBLICATIONS

Mildenhall, et al., "NeRF: Representing Scenes as Neural Radiance Fields for View Synthesis", In Repository of arXiv:2003.08934v2, Aug. 3, 2020, 25 Pages.
"International Search Report and Written Opinion Issued in PCT Application No. PCT/US22/018403", dated Jul. 15, 2022, 9 Pages.

\* cited by examiner

*Primary Examiner* — Ryan McCulley
(74) *Attorney, Agent, or Firm* — Workman Nydegger

(57) ABSTRACT

Methods and systems are provided for training a machine learning model to generate density values and radiance components based on positional data, along with a weighting scheme associated with a particular view direction based on directional data to compute a final RGB value for each point along a plurality of camera rays. The positional data and directional data are extracted from set of training images of a particular static scene. The radiance components, density values, and weighting schemes are cached for efficient image data processing to perform volume rendering for each point sampled. A novel viewpoint of a static scene is generated based on the volume rendering for each point sampled.

19 Claims, 7 Drawing Sheets

HIGH RESOLUTION NEURAL RENDERING

RELATED APPLICATION(S)

This application claims the benefit and priority of U.S. Provisional Patent Application No. 63/162,365, filed Mar. 17, 2021, which is incorporated by reference herein in its entirety.

BACKGROUND

There are many methods being researched for rendering a continuous three-dimensional (3D) viewpoint of a 3D scene comprising different materials and objects with complex geometry. The goal of such research is to be able to render novel viewpoints of the scene from a limited number of (two-dimensional) 2D training images. Such static scenes are able to be represented by a continuous 5D or 6D function which takes as input a position and a direction and outputs the radiance in the direction at that position. Alternatively, the codomain of such a function is the radiance in each direction and point in space. Some research is directed to encoding objects and scenes into neural networks like multi-layer perceptrons (MLPs).

Neural Radiance Fields (NeRF) is a recently discovered method that trains a neural network to capture a 3D scene based on a number of images of that scene. Once the network is trained, it can then be used to generate an image of the scene from any viewpoint and with any camera parameters. However, while NeRF methods render fine details of the scene with accuracy, the process of rendering a novel viewpoint is very slow and is computationally very expensive. The main source of inefficiency in NeRF is that the neural network has to be called as many as 200 times for each pixel that is rendered. For a 1 MPix image this results in 200 million calls to the neural network to render a single image. Thus, to render a single image, a computing system is processing data for an extensive period of time to achieve these detailed results.

In view of the foregoing, there is an ongoing need for improved systems and methods for generating training data and training models, including the deployment of such models, for improved image rendering.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments are directed towards embodiments for training a machine learning model to generate color outputs of a static scene. A three-dimensional (3D) static scene is identified. After obtaining a set of training images comprising multiple viewpoints of the 3D static scene, a plurality of camera rays corresponding to the set of training images is identified. A set of points is sampled along the plurality of camera rays to obtain positional and directional data for each point included in the set of points. Then, a first neural network is trained on the positional data and the positional data is processed by the first neural network to generate a density value and a plurality of radiance components. The plurality of radiance components and density values are cached.

A second neural network is also trained on the directional data. The directional data is processed by the second neural network to generate a weighting scheme for a plurality of view directions. The weighting scheme comprises a plurality of weight values to be applied to the plurality of radiance components. The weighting scheme is cached for each view direction included in the plurality of view directions, and a final color value is generated by combining the cached plurality of radiance components according to the cached weighting scheme associated with a particular view direction.

Some embodiments are also directed to systems and methods for generating a novel viewpoint of a static scene based on cached directional and positional data obtained for the static scene. In such embodiments, a computing system identifies a three-dimensional static scene and a novel viewpoint from which to render a two-dimensional image of the three-dimensional static scene. A cached database of radiance components for a plurality of points included in a volumetric representation of the three-dimensional static scene is accessed, along with a cached database of weighting schemes for a plurality of view directions. For each point included in the plurality of points, generate a final color value by combining a set of radiance components for each point according to a weighting scheme included in the cached database of weighting schemes corresponding to one or more novel view directions in the plurality of view directions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed embodiments are directed towards embodiments for generating novel viewpoints of a three-dimensional scenes and for training and caching neural networks configured to generate novel viewpoints of three-dimensional scenes.

Figure 1:
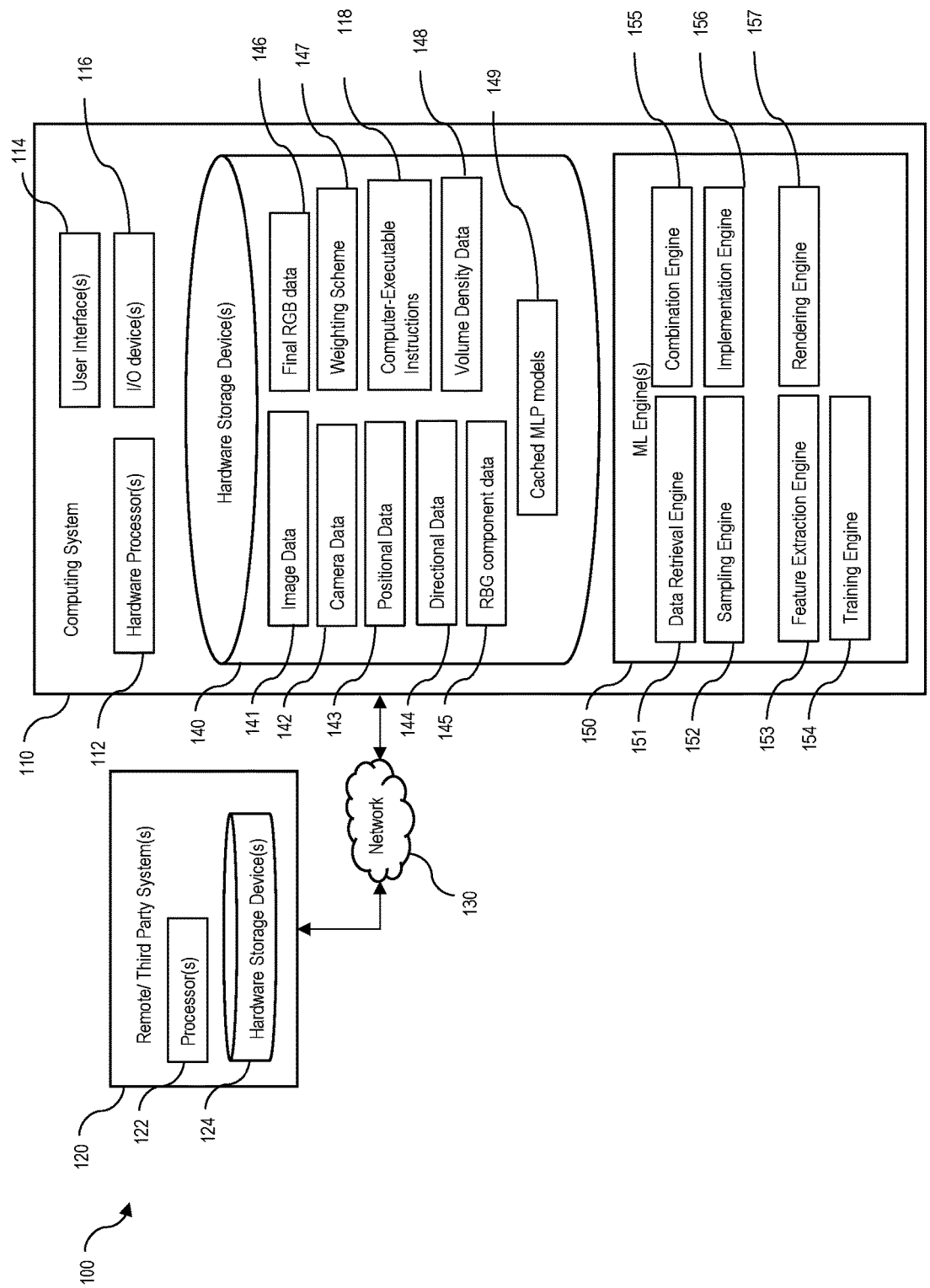
FIG. 1 illustrates a computing environment in which a computing system incorporates and/or is utilized to perform disclosed aspects of the disclosed embodiments.

Attention will now be directed to FIG. 1, which illustrates components of a computing system 110 which may include and/or be used to implement aspects of the disclosed invention. As shown, the computing system includes a plurality of machine learning (ML) engines, models, neural networks and data types associated with inputs and outputs of the machine learning engines and models.

Attention will be first directed to FIG. 1, which illustrates the computing system 110 as part of a computing environment 100 that also includes remote/third party system(s) 120 in communication (via a network 130) with the computing system 110. The computing system 110 is configured to train a plurality of machine learning models for volume rendering, image rendering, image data processing, and more particularly, training machine learning models to generate light values per point in a volumetric representation of a static three-dimensional scene based on cached position-based and direction-based neural networks. The computing system 110 is also configured to generate training data configured for training machine learning models.

The computing system 110, for example, includes one or more processor(s) 112 (such as one or more hardware processor(s)) and a storage (i.e., hardware storage device(s) 140) storing computer-executable instructions 118 wherein one or more of the hardware storage device(s) 140 is able to house any number of data types and any number of computer-executable instructions 118 by which the computing system 110 is configured to implement one or more aspects of the disclosed embodiments when the computer-executable instructions 118 are executed by the one or more processor(s) 112. The computing system 110 is also shown including user interface(s) 114 and input/output (I/O) device(s) 116.

As shown in FIG. 1, hardware storage device(s) 140 is shown as a single storage unit. However, it will be appreciated that the hardware storage device(s) 140 is configurable as a distributed storage that is distributed to several separate and sometimes remote and/or third-party system(s) 120. The computing system 110 can also comprise a distributed system with one or more of the components of computing system 110 being maintained/run by different discrete systems that are remote from each other and that each perform different tasks. In some instances, a plurality of distributed systems performs similar and/or shared tasks for implementing the disclosed functionality, such as in a distributed cloud environment.

The hardware storage device(s) 140 are configured to store the different data types including image data 141, camera data 142, positional data 143, directional data 144, radiance component data 145, final RGB data 146, Weighting scheme data 147, computer-executable instructions 118, volume density data 148, and cached MLP models described herein.

The storage (e.g., hardware storage device(s) 140) includes computer-executable instructions 118 for instantiating or executing one or more of the models and/or engines shown in computing system 110. The models are configured as machine learning models or machine learned models, such as deep learning models and/or algorithms and/or neural networks. In some instances, the one or more models are configured as engines or processing systems (e.g., computing systems integrated within computing system 110), wherein each engine (i.e., model) comprises one or more processors (e.g., hardware processor(s) 112) and computer-executable instructions 118 corresponding to the computing system 110.

The image data 141 comprises a plurality of images captured at various viewing angles or view directions. Additionally, or alternatively, the image data 141 comprise metadata (i.e., attributes, information, object or scene identifiers, etc.) corresponding to the particular source from which the data is collected. The metadata comprises attributes associated with the type of object or static scene, characteristics of the image data 141 and/or information about where, when and/or how the image data 141 is obtained. The plurality of images corresponding to a particular scene or object are used as training images to train the neural network to render novel viewpoints of the particular static scene or object included in the plurality of images.

The camera data 142 comprises data about the type of camera used, whether it is a simulated (or virtual) camera or real camera, the direction of the camera rays in relation to a volumetric representation of the static scene, camera lens information, camera model identifiers, height of the camera capture angle, distance from one or more objects within the static scene and other attributes associated with the cameras and capture images.

The positional data 143 is configured as a dataset, wherein each data point includes a location identifier for a point sampled along a camera ray (either simulated by a real or virtual camera). The location identifier is configured as a three-dimensional coordinate (e.g., Cartesian coordinates) specifying a particular point within a bounded volumetric representation of a static scene. Thus, the positional data 143 also includes boundary data for the volumetric representation and locations for one or more objects within the volumetric representation.

Positional data 143 is stored for every point sampled along each camera ray simulated within the volumetric representation. To improve storage efficiency, when caching a trained neural network, a sparse volume is generated for holding the radiance components and the weights. The weights are held in the sparse volume because the inputs are known to lie on a surface of a sphere (thus anywhere outside the surface is empty space). The radiance components are also held in the sparse volume because the parts of the scene that are empty our known due to the knowledge of the density values that the network outputs. To further improve storage efficiency, positional data 143 is stored only for occupied space (e.g., volumetric space occupied by an object or material in the static scene), wherein empty space is not included in the volumetric data set (also referred to as a sparse volume).

The directional data 144 is configured as a dataset, wherein each data point includes a view direction identifier for a point sampled along a camera ray (either simulated by a real or virtual camera). The view direction is the direction of the ray that the point is sampled on. Also, the directional data is the ray direction which is the same for all the points along a single ray. The direction identifier is configured as a three-dimensional vector specifying a particular viewing angle of a point. Directional data 144 is stored for every point sampled along each camera ray simulated within the volumetric representation. In some instances, the directional data 144 is also derived from the camera data 142 which includes image capture angles for the cameras, which then correspond to the viewing direction of a particular point. Positional data 143 and directional data 144 include data for corresponding points sampled within the volumetric representation of the static scene. In other words, each point that is sampled has positional data 143 and directional data 144.

The radiance component data 145 includes a set of color maps, deep radiance maps, RGB components, and/or radiance components for each point included in a volumetric representation of a static scene. In other words, the radiance components or RGB values are generated for a set of points sampled on a 3D grid within a static scene. These grids have various sizes such as 256^3 and/or 512^3 points. The set of radiance components are configured to be combined according to a weighting scheme (e.g., weighting scheme data 147). Each weighting scheme included in the weighting scheme data 147 corresponds to a particular view direction of the static scene. Each weighting scheme comprises a plurality of weight values which determine the percentage of each radiance component of a set of radiance components to be combined to form a final RGB value (e.g., final RGB data 146). The weight values are stored as percentages. Alternatively, the weight values are not constrained to sum to one.

Hardware storage device(s) 140 also store volume density data 148 which includes a plurality of density values which are configured to represent an opacity of a point included in the volumetric representation of the static scene. The density value corresponds to an opacity of a material or object included in the static scene and is equal to or greater than zero. A zero value for density represents a low opacity or transparent point. A higher value for density represents a high opacity or more solid point. The density values, along with RGB values can represent the radiance, the transparency, the reflectiveness, or other attributes of different points of materials and objects included in a volumetric representation of the static scene.

The hardware storage device(s) 140 is also configured to store a cached network (e.g., cached MLP models 149) corresponding to a machine learning model configured to generate novel viewpoints of a static scene based on a set of training images of the static scene. The cached MLP models 149 include a first multilayer perceptron (MLP) network parameterized by positional data 143 to generate volume density data 148 and radiance component data 145. The radiance component data 145 and volume density data 148 are cached, wherein a computing system (e.g., computing system 110) can access the cached data to perform efficient volume rendering for the static scene. The cached MLP models 149 also include a second MLP network parameterized by directional data 144 to generate weighting scheme data 147. The weighting schemes generated by the second MLP network are cached according to various view directions, wherein a computing system can access the weighting schemes when performing volume rendering and other image processing tasks.

An additional storage unit for storing machine learning (ML) Engine(s) 150 is presently shown in FIG. 1 as storing a plurality of machine learning models and/or engines. For example, computing system 110 comprises one or more of the following: a data retrieval engine 151, a sampling engine 152, a feature extraction engine 153, a training engine 154, a combination engine 155, an implementation engine 156, a rendering engine 157 which are individually and/or collectively configured to implement the different functionality described herein.

For example, the data retrieval engine 151 is configured to locate and access data sources, databases, and/or storage devices comprising one or more data types from which the data retrieval engine 151 can extract sets or subsets of data to be used as training data. The data retrieval engine 151 receives data from the databases and/or hardware storage devices, wherein the data retrieval engine 151 is configured to reformat or otherwise augment the received data to be used as training data. Additionally, or alternatively, the data retrieval engine 151 is in communication with one or more remote/third-party systems (e.g., remote/third party system(s) 120) comprising remote/third party datasets and/or data sources. In some instances, these data sources comprise visual services that record text, images, and/or video.

The data retrieval engine 151 accesses electronic content comprising image data 141, camera data 142, positional data 143, directional data 144, radiance component data 145, final RGB data 146, weighting scheme data 147, volume density data 148 and/or other types of audio-visual data including video data, image data, holographic data, 3-D image data, etc. The data retrieval engine 151 is a smart engine that is able to learn optimal dataset extraction processes to provide a sufficient amount of data in a timely manner as well as retrieve data that is most applicable to the desired applications for which the machine learning models/engines will be trained. For example, the data retrieval engine 151 can learn which databases and/or datasets will generate training data that will train a model (e.g., for a specific query or specific task) to increase accuracy, efficiency, and efficacy of that model in the desired image processing techniques.

The data retrieval engine 151 locates, selects, and/or stores raw recorded source data (e.g., image data 141) wherein the data retrieval engine 151 is in communication with one or more other ML engine(s) and/or models included in computing system 110. In such instances, the other engines in communication with the data retrieval engine 151 are able to receive data that has been retrieved (i.e., extracted, pulled, etc.) from one or more data sources such that the received data is further augmented and/or applied to downstream processes. For example, the data retrieval engine 151 is in communication with the training engine 154 and/or implementation engine 156.

The sampling engine 152 is configured to identify simulated camera rays within a volumetric representation of a static scene. The sampling engine 152 then identifies a set of points along a particular camera ray (i.e., sampling a set of points). Based on the sampled set of points, the feature extraction engine 153 accesses positional data 143 and directional data 144 for each point. The feature extraction engine 153 is configured for extracting positional data 143 and/or directional data 144 information from electronic content, from image data 141 and camera data 142.

The training engine 154 is in communication with one or more of the data retrieval engine 151, the sampling engine 152, the feature extraction engine 153 or the implementation engine 156. In such embodiments, the training engine 154 is configured to receive one or more sets of training data from the data retrieval engine 151. After receiving training data relevant to a particular application or task, the training engine 154 trains one or more models on the training data. The training engine 154 is configured to train a model via unsupervised training or supervised training.

The training engine 154 is configured to train one or more machine learning models (e.g., MLP neural networks) on a set of training images comprising a static scene to generate novel viewpoints of the static scene. More particularly, the training engine 154 is configured to train a first MLP network on positional data to generate volume density data 148 and radiance component data 145. The training engine 154 is also configured to train a second MLP network on directional data 144 to generate weighting scheme data 147. The training engine 154 is configured to train a machine learning model to minimize error between the rendered image of the static scene and the corresponding training image of the static scene. The training of the two neural networks (e.g., the directional neural network and the positional neural network) is performed as two separate steps in series. Alternatively, the training of the first MLP network, parameterized by positional data) and the training of the second MLP network, parameterized by directional data, occurs in parallel or concurrently. In such embodiments, the training loss (the function that is optimized by the training process) compares the rendered pixels to ground truth pixels and to render a single pixel, thus requiring output from both of the neural networks to minimize loss between the rendered pixels and the ground truth pixels.

The computing system 110 includes a combination engine 155 which is configured to combine a set of radiance component data corresponding to a particular point based on a weighting scheme associated with a particular view direction to generate a final RGB value for the particular point.

The computing system 110 also includes an implementation engine 156 in communication with any one of the models and/or ML engine(s) 150 (or all of the models/engines) included in the computing system 110 such that the implementation engine 156 is configured to implement, initiate or run one or more functions of the plurality of ML engine(s) 150. In one example, the implementation engine 156 is configured to operate the data retrieval engines 151 so that the data retrieval engine 151 retrieves data at the appropriate time to be able to generate training data for the training engine 154.

The implementation engine 156 facilitates the process communication and timing of communication between one or more of the ML engine(s) 150 and is configured to implement and operate a machine learning model (or one or more of the ML engine(s) 150) which is configured to access the cached MLP models to generate light values per point (e.g., radiance values), color values, perform volume rendering, and generating novel images based on a view direction not previously captured by an image included in a set of training images.

The rendering engine 157 is configured to perform volume rendering for each point sampled along a particular camera ray based on the final RGB value and density value, to perform volume rendering for each point included in the volumetric representation of a static scene, and to render a new 2D image comprising a novel viewpoint of the static scene. The rendering engine 157 is also configured to generate a continuous 3D viewing of the static scene based on a plurality of novel viewpoints and/or set of captured images of the static scene. More particularly, an image is rendered by combining the set of radiance component data to generate a final color value and then performing volume rendering using the final color value and a density value for a particular point.

The rendering engine 157 supports a plurality of rendering modes, for example, volume look-up and ray-traced volume look-up. In the volume lookup, the call to the neural networks is replaced with a cache lookup. In the ray-traced volume look-up, hardware accelerated ray-tracing is implemented to skip empty space included in the volumetric representation of the three-dimensional static scene. A collision mesh is computed from a sign-distance function derived from the density volume. In some instances, for volumes greater than $512^{\wedge}3$ points, the volume is downsized by a factor of two to reduce mesh complexity. The rendering engine 157 integrates points along the ray only after a first hit is identified by the collision mesh. The mesh generation parameters are held constant across all datasets, and the storage complexity for the collision meshes are negligible compared to the grid cache. By leveraging the collision mesh, the computing system uses the ray-traced volume lookup to make significantly less calls to the cache and offers improved computational speed over using a volume lookup mode.

The computing system is in communication with remote/third party system(s) 120 comprising one or more processor(s) 122 and one or more computer-executable instruction(s) 124. It is anticipated that, in some instances, the remote/third party system(s) 120 further comprise databases housing data that could be used as training data, for example, static scene data not included in local storage. Additionally, or alternatively, the remote/third party system(s) 120 include machine learning systems external to the computing system 110. The remote/third party system(s) 120 are software programs or applications.

Neural Radiance Fields (NeRF) are a method for training a neural network to render a 3D scene based on a certain number of images of that scene. Once the network is trained, the network is configured to generate images of the scene from any viewpoint and with any camera parameters. However, conventional NeRF networks are very slow. The main source of inefficiency in conventional NeRF networks are they the neural network has to be called as many as 200 times for each pixel that is rendered. For a 1MPix image, this results in 200 million calls to the neural network to render a single image.

To combat this inefficiency, the present invention is directed to systems and methods for separating the NeRF neural network into two separate networks that can be cached for efficient inference. By caching the neural network outputs for a wide selection of inputs and then replacing the neural network execution with a cache look-up, the processing time, storage, and computation is significantly decreased. It will be appreciated that the disclosed embodiments for separating and caching the positional and directional components of the neural network are applicable to any neural network that is configured to receive direction and position data as input parameters and output a light value per point (e.g., radiance).

A static scene is represented as a continuous 6D function that outputs the (1) radiance emitted in each direction at each point in space and (2) the density at each point. The density is configured as a variable opacity value which determines the amount of radiance that is present in a ray passing through each point. Separately cached multi-layer perceptrons (MLPs) (e.g., a deep fully connected neural network without convolutional layers) are used to convert the 6D coordinate (direction vector and position) of a particular point to a single volume density and view-dependent RGB color. To render a novel view of the static scene (e.g., a view not previously included in a set of previously captured images), the volume density and view-dependent RGB color is generated for each point in a volumetric representation of the static scene. Based on the novel viewpoint desired, the system samples the volume densities and view-dependent RGB colors for all points corresponding to the rendering of the novel viewpoint.

Figure 2B:
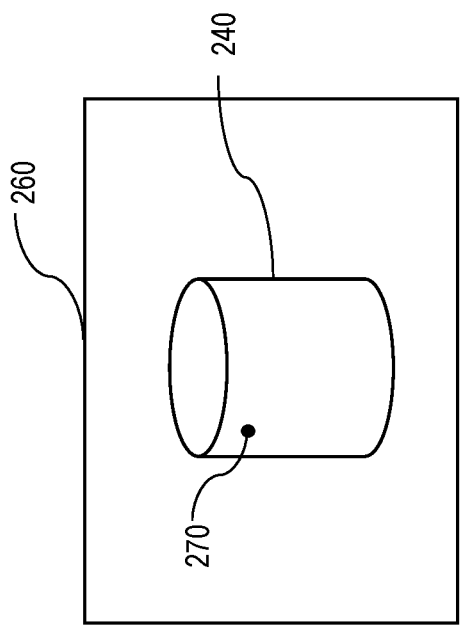
FIGS. 2A and 2B illustrate an example embodiment for generating a novel viewpoint of a static scene based on a training image.
Figure 2A:
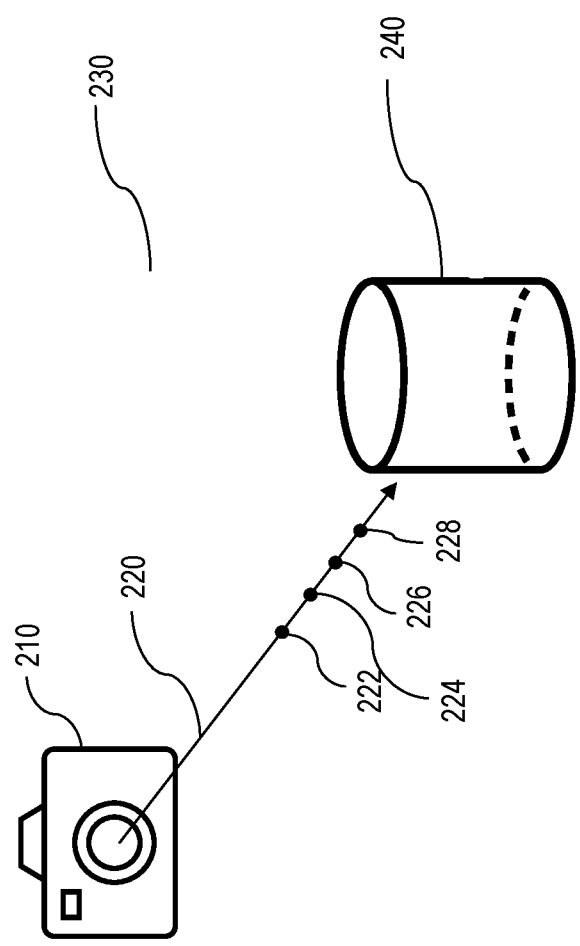

Referring now to FIGS. 2A and 2B, a plurality of images is captured of a particular static scene by a plurality of cameras (e.g., camera 210), or a by a single camera in different locations. The parameters of the cameras, including an image capture direction and position of the cameras are known and accessible by the system. A volumetric representation 230 of the static scene 240 is generated, wherein camera rays (e.g., simulated camera ray 220) that are based on the image capture direction for each image included in the plurality of images are simulated throughout the volumetric representation.

The system samples a plurality of coordinates along each camera ray. The plurality of coordinates, or points, (e.g., points 222, 224, 226, 228) each have a 2D viewing direction based on an image capture direction. The positions of each point and the directions associated with each point in the simulated camera ray 220 are applied as inputs to a neural network to produce an output set of colors and densities. Classical volume rendering techniques are then employed to aggregate these colors and densities into a 2D image (e.g., image 260), wherein the plurality of coordinates (e.g., points 222, 224, 226, 228), now defined by a respective set of colors and densities, associated with a particular simulated camera ray are sampled and collapsed into a pixel (e.g., pixel 270) to be included in the newly rendered novel viewpoint of the static scene 240.

A plurality of novel viewpoints is then rendered from different angles corresponding to the static scene. The novel viewpoints can be rendered from any angle based on the set of captured images (e.g., training images). The plurality of novel viewpoints, along with the set of initially captured images, are then processed (e.g., through gradient-based optimization) to produce a continuous three-dimensional view of the static scene.

The disclosed embodiments beneficially draw from attributes of volumetric representations, including the ability to represent complex real-world geometry and appearance. Other benefits include reducing storage and computation costs by representing continuous scenes (or generating novel viewpoints) with complex geometry and materials as neural radiance fields using machine learning models parameterized as partially cached multi-layer perceptron (MLP) networks. The cached portions correspond to positional and directional encodings which have been disentangled from the 6D function data corresponding to the volumetric representation of the static scene.

Volume rendering techniques are also used to optimize the representations using standard RGB images. An optimized sampling strategy is used to identify the points in the volumetric representation that correspond to visible scene content (e.g., empty space points are omitted during rendering processes to focus computational efforts on the visible scene content).

A continuous view of the static scene is represented by a 6D vector-valued function. Inputs to this function include a location (e.g., represented by 3D cartesian coordinates) and a viewing direction (e.g., represented by a 3D unit vector). Outputs include an emitted color (e.g., RGB data or radiance data) and volume density. The continuous view is rendered by a dual MLP network that included cached portions for direction-based and position-based parameters, wherein the positional encoding and directional encoding inputs are disentangled from the 6D vector-valued function.

Disclosed embodiments beneficially produce a density and a set of radiance components based on positional encoding data. The radiance components are deep radiance maps and/or RGB-based color data. The computing system generates a pre-set number of radiance maps. Based on the directional encoding data, a set of weighting values, or weighting scheme, is generated and configured to be applied to the set of radiance components. The weighting scheme determines the value of each radiance component to be included in the final color rendering for a particular point sampled along a ray. A plurality of points is then sampled along a particular ray and classical volume rendering techniques are used to generate a color and density rendering for a pixel. The volume density corresponds to a differential probability of a ray (e.g., simulated camera ray) ending at a particular point location.

Producing a positional encoding comprises mapping the positional inputs to a higher dimensional space using high frequency functions before applying them to a neural network configured to generate the radiance components and density data. This encoding process allows more accurate data fitting which also includes high frequency variation. An additional function is applied to each of the positional coordinate values (e.g., "x", "y", "z"), which are then normalized. The functions are used to map continuous input coordinates into a higher dimensional space to allow the MLP network to better approximate a higher frequency function, which in turns allows for higher quality rendering of detailed static scenes. With the sampling of views, photorealistic novel views (or new views based on a set of training images) can be rendered. Error is minimized in rendering the novel views based on the set of captured images.

Figure 3:
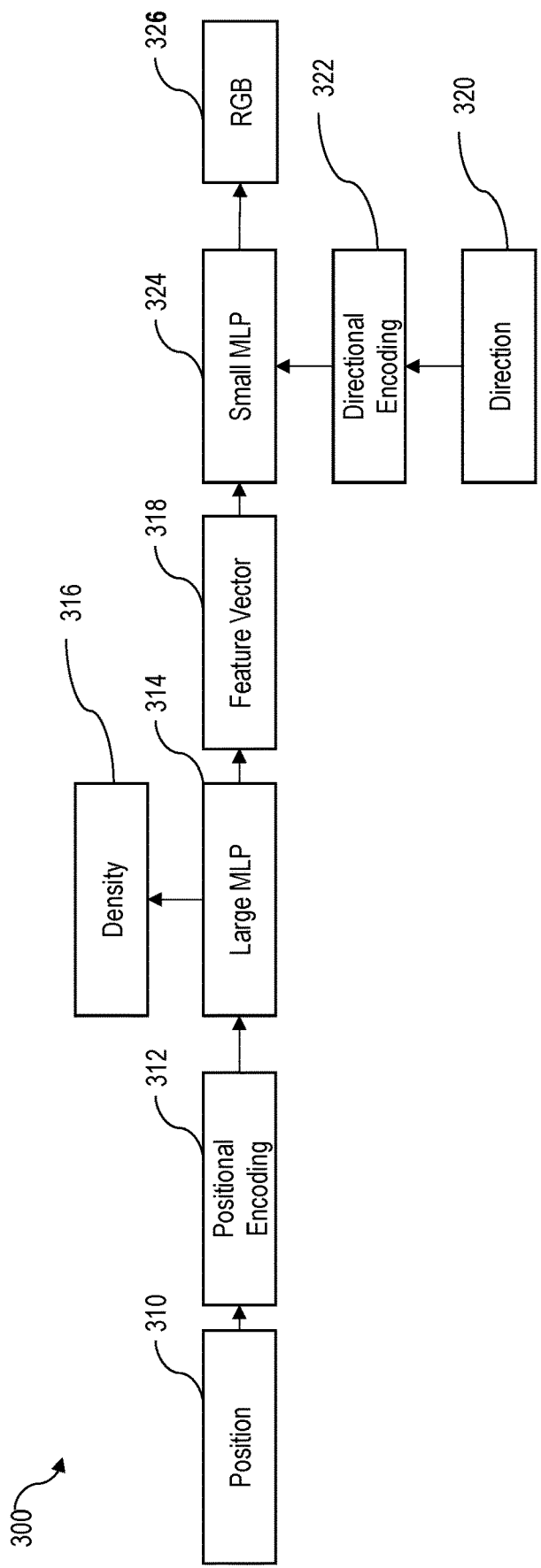
FIG. 3 illustrates a conventional embodiment of a process flow diagram for training a machine learning model to generate color values for points included in a volumetric representation of a static scene.

As shown in FIG. 3, a conventional system for NeRF neural networks include a large MLP 314 configured to receive position data 310 (e.g., location coordinates for each point along a camera ray) that is processed for higher frequency applications through a positional encoding operation 312. The large MLP 314 then generates a density value 316 for each point based on the position data 310 corresponding to the density value 316. The large MLP 314 also outputs a feature vector 318 that is coupled with direction data 320 (and subsequent directional encoding data 322) that is received by a second, small MLP 324. This small MLP 324 is then configured to generate a final RGB value 326 per point. Thus, because of these constraints, wherein position data 310 and direction data 320 is entangled between the two neural networks, caching separate neural networks according to the disclosed embodiments is not feasible. The conventional neural network takes in 6 dimensional inputs (3 dimensions for position and 3 dimensions for direction) which takes a very large amount of memory to cache. For example, if the system were to sample five hundred and twelve values for each input parameters and store the outputs (e.g., in float16), the cache would occupy one hundred and forty four Petabytes.

Figure 4:
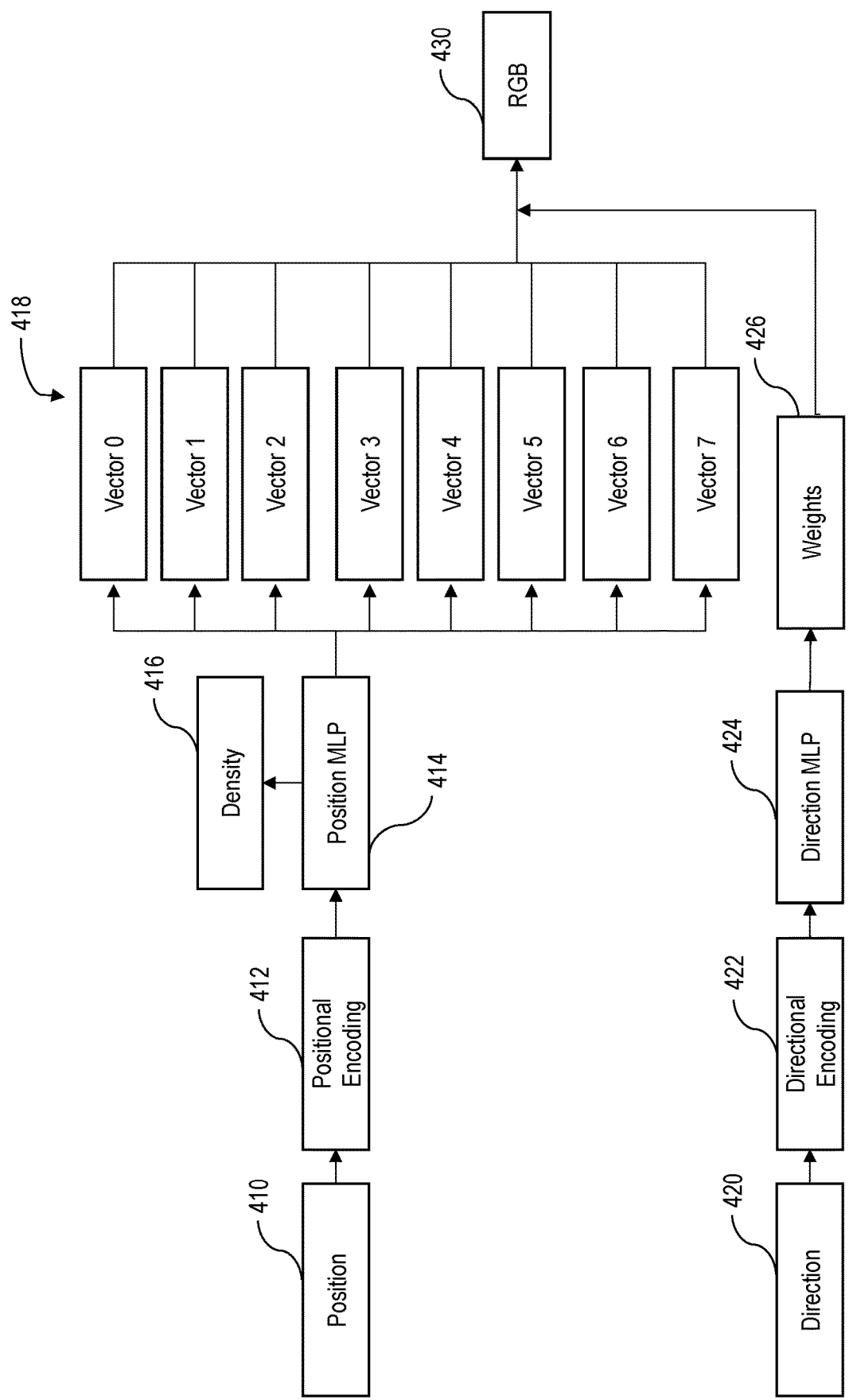
FIG. 4 illustrates a novel embodiment of a process flow diagram for training a machine learning model to generate color value for points included in a volumetric representation of a static scene based on disentangled positional and directional data.

Thus, as shown in FIG. 4, a novel neural network is shown to increase efficiency and decrease the necessary memory to cache the neural networks. The neural network 300 is shown comprising a position MLP 414 and a direction MLP 424. The position MLP 414 takes as input the position data 410 (e.g., 3 dimensional coordinates for a location of a point sampled along a camera ray). The position data is processed to generate a positional encoding 412 which is then received by the position MLP 414. The position MLP 414 processes the positional encoding 412 for each point sampled and outputs (1) a density value 416 and (2) a plurality of radiance components 418 (e.g., Vectors 0, 1, 2, 3, 4, 5, 6, 7), also referred to as color component maps. FIG. 3 shows at least 8 radiance components (e.g., RGB vectors or color maps), but it will be appreciated that any number of radiance components 418 can be generated by the position MLP 414.

A second neural network (e.g., direction MLP 424) is shown and is configured to receive directional data 420 processed to a directional encoding 422 as an input parameter. The directional encoding 422 is processed from directional data 420 (e.g., three-dimensional vector data corresponding to sampled point along a camera ray). The direction MLP 424 is configured to generate a weighting scheme (e.g., weights 426) or weight values for each direction associated with the sampled points. The weighting scheme determines the value or amount of each radiance component that will be included in the final RGB rendering. The weights are multiplied with the components via a dot product. The radiance components 418 (i.e., color component maps) are combinable in many ways based on the weighting scheme (e.g., weights 426) to produce final color data (e.g., final RGB data 430). The density values 416 and final RGB data 430 are then used to render each pixel in the novel viewpoint.

Figure 5:
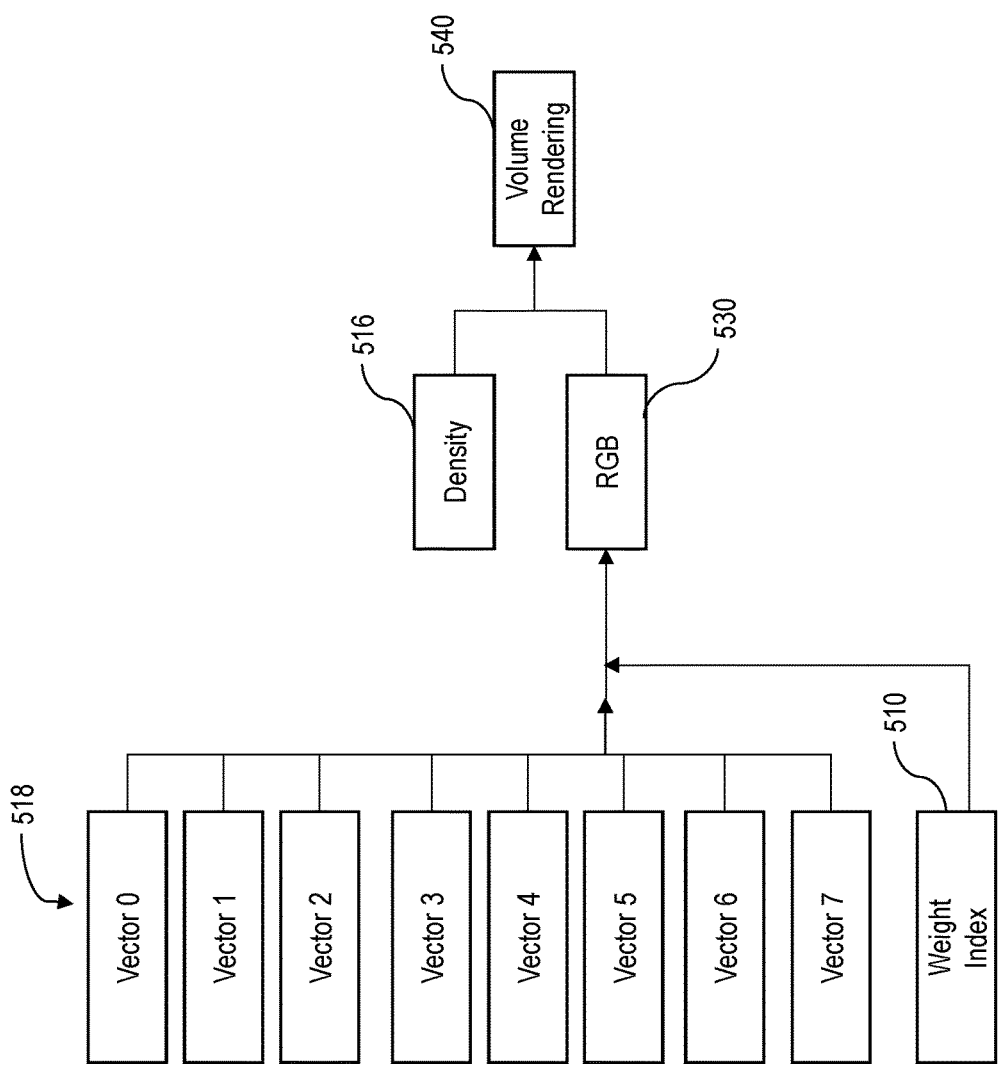
FIG. 5 illustrates one embodiment of a process flow diagram for generating a novel viewpoint of a static scene by accessing cached radiance components and cached weighting schemes.

As shown in FIG. 5, because the position and view direction are disentangled, the model can be efficiently cached. For example, if the system were to sample five hundred and twelve values for each input parameter and store the outputs (e.g., in float16), the cache would occupy 8.86 Gigabytes. This is smaller than the corresponding cache for a standard NeRF model by a factor of over 16,000,000. Moreover, this type of dense cache is convertible to a sparse representation that significantly decreases the amount of memory storage needed to store the network. Thus, once the cache is computed, the volume rendering process then relies on an efficient lookup, instead of expensive calling of the neural network for each novel viewpoint.

Specifically, the weighting schemes for each direction corresponding to the sampled points are stored as weight index 510, such that when a novel viewpoint is selected for rendering, the system looks up the applicable weighting scheme in the weight index. The radiance components 518 (e.g., Vector 0-Vector 7) are also cached, such that the radiance components 518 are combined to form final RGB values 530 based on a certain combination of radiance components per point. The final RGB values 530 and density data 516 (previously output by the position MLP) are used in a volume rendering 540 of a particular point. The system is called for each point that is sampled along one or more camera rays.

The generation of the cached data takes from a few seconds to a few minutes depending on the size of the volumetric representation. Once the cache is computed, which only has to be computed once after the neural network(s) is/are trained, the values and data are configured to be accessed directly in the cache without additional network computation.

Figure 6:
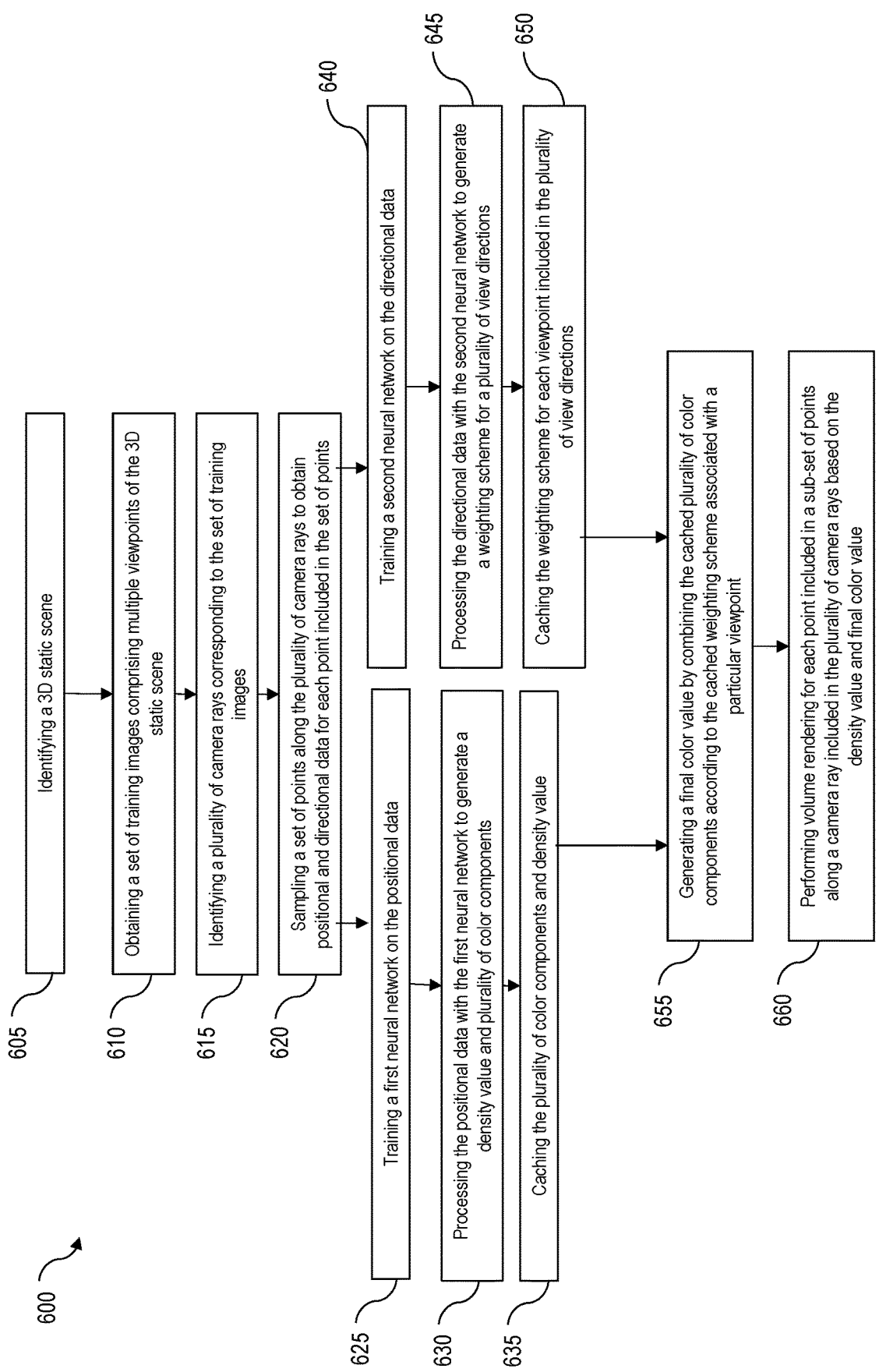
FIG. 6 illustrates one embodiment of a flow diagram having a plurality of acts for training a machine learning model to generate color values for points included in a volumetric representation of a static scene.

Attention will now be directed to FIG. 6 which illustrates a flow diagram 600 that includes various acts (act 605, act 610, act 615, act 620, act 625, act 630, act 635, act 640, act 645, act 650, act 655, and act 660) associated with exemplary methods that can be implemented by computing system 110 for obtaining training data and training a machine learning model for generating light and color values per point of a static scene.

The first illustrated act includes an act of identifying a three-dimensional (3D) static scene (act 605). The computing system then obtains a set of training images comprising multiple viewpoints of the 3D static scene (act 610) and identifies a plurality of camera rays corresponding to the set of training images (act 615). A set of points is sampled along the plurality of camera rays to obtain positional and directional data for each point included in the set of points (act 620).

The computing system trains a first neural network on the positional data (act 625) and processes the positional data with the first neural network to generate a density value and a plurality of radiance components (act 630). After generating the outputs, the computing system caches the plurality of radiance components (act 635). In some embodiments, the plurality of radiance components described here are different than the plurality of radiance components obtained by processing all of the points in the dataset. The cache is computed over 3D points sampled on a grid or volumetric representation for the static scene. These points that are sampled, in some instances, coincide with points in the training set. In some instances, the two sets of points do not coincide.

The computing system also trains a second neural network on the directional data (act 640) and processes the directional data with the second neural network to generate a weighting scheme for a plurality of view directions, the weighting scheme comprising a plurality of weight values to be applied to the plurality of radiance components (act 645). The first neural network and second neural network are configured as multi-layer perceptrons.

After generating the output, the weighting scheme for each view direction included in the plurality of view directions is cached (act 650). When storing the view directions, the view directions are sampled on a surface of a sphere with some density that is dependent on the desired cache size. Some of the view directions may coincide with directions included in the training data.

Finally, a final color value is generated by combining the cached plurality of radiance components according to the cached weighting scheme associated with a particular view direction (act 655).

The computing system also performs volume rendering for each point included in a sub-set of points along a camera ray included in the plurality of camera rays based on the density value and final color value (act 660). The sub-set of points along the camera ray are collapsible into a rendered pixel to be included in a two-dimensional (2D) image of the static scene. The computing system can then apply the two-dimensional image of the static scene in an augmented virtual reality application.

Alternatively, to performing volume rendering as described above, the computing system also derives a collision mesh from the volumetric representation by computing a sign-distance function based on the volume density for a plurality of points sampled along a camera ray. A first point included in the plurality of points is identified which corresponds to a first hit computed by the collision mesh. Then volume rendering is performed by integrating the sub-set of points included in the plurality of points, the sub-set of points corresponding to non-empty space identified by the collision mesh after the first hit.

Prior to deriving a collision mesh from a volumetric representation of the three-dimensional static scene by computing a sign-distance function based on a volume density for a plurality of points sampled along a camera ray, the computing system downsizes the volumetric representation of the three-dimensional static scene by a pre-determined factor based on an original volume of the volumetric representation.

The rendered pixel is compared with a corresponding pixel in a training image included in the set of training images for minimizing error between the rendered pixel and corresponding pixel in the training image.

The method is also directed to generating a positional encoding for the positional data and generating a directional encoding for the directional data.

The set of training images are 2D and RGB images of the static scene, set of training images further comprises metadata including camera parameters and static scene boundaries, and the radiance components and final color value are configured as radiance components. The static scene boundaries define a bounding box from which the inputs to the neural networks will be sampled. If an approximate mesh or point cloud are available for the scene, its extreme points define the bounding box. Alternatively, the near and far ray bounds that are specified for each camera in the training set are used to define the bounding box or the bounding box is defined manually by a user.

In addition to the set of training images, the computing system also obtains a set of camera parameters corresponding to the plurality of camera rays, determines a minimum bound and a maximum bound of each camera ray included in the plurality of camera rays based on the set of camera parameters, and samples the set of points along the plurality of camera rays from the minimum bound to the maximum bound.

Figure 7:
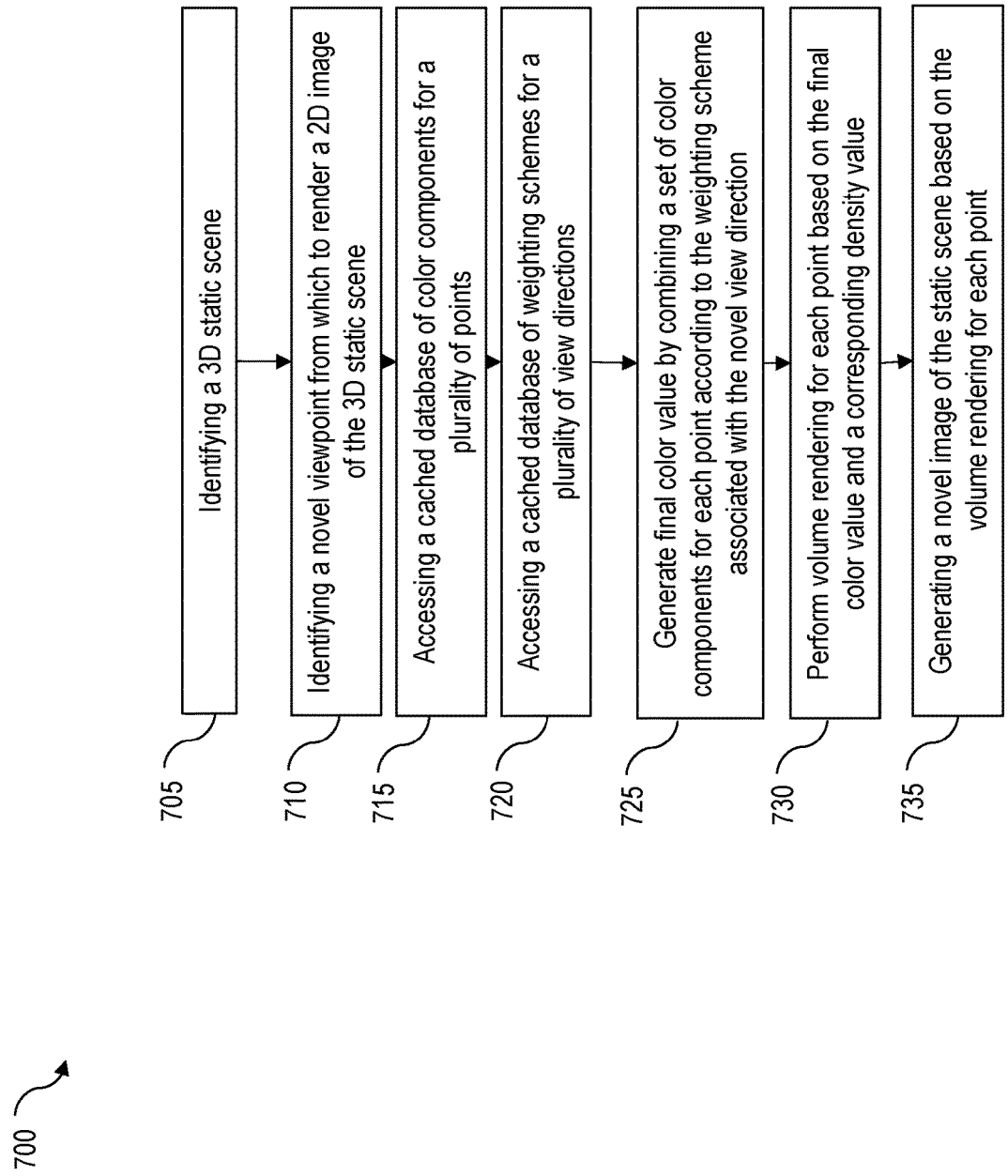
FIG. 7 illustrates one embodiments of a flow diagram having a plurality of acts for generating color values for points included in a volumetric representation of a static scene to generate a novel viewpoint image of the static scene.

Attention will now be directed to FIG. 7 which illustrates a flow diagram 700 that includes various acts (act 705, act 710, act 715, act 720, act 725, act 730, and act 735) associated with exemplary methods that can be implemented by computing system 110 for generating novel viewpoints of a static scene.

The first illustrated act includes an act of identifying a 3D static scene (act 705) and the second illustrated act includes an act of identifying a novel viewpoint from which to render a 2D image of the 3D static scene (act 710). The computing system then accesses a cached database of radiance components for a plurality of points included in a volumetric representation of the 3D static scene (act 715) and accesses a cached database of weighting schemes for a plurality of view directions (act 720). The volumetric representation is configurable as a Neural Radiance Field. This plurality of points are points that lie along rays that pass through the image that is to be rendered from one or more novel viewpoints. For each point included in the plurality of points, a final color value is generated by combining a set of radiance components for each point according to the weighting scheme corresponding to one or more novel view directions included in the plurality of view directions (act 725).

The computing system generates a plurality of rays, along which the plurality of points is generated and then sampled. The colors for those points would be computed for act 725 and the color for the pixels that the rays correspond to would be computed in act 730.

The computing system performs volume rendering for each point based on the final color value and a corresponding density value (act 730). The computing system also generates the novel viewpoint of the static scene based on the volume rendering for each point, wherein the plurality of points is collapsed into a plurality of pixels to be included in the novel viewpoint of the static scene (act 735).

In view of the foregoing, it will be appreciated that the disclosed embodiments provide many technical benefits over conventional systems and methods for generating machine learning training data configured to train a machine learning model to generate RGB color values for points of a static scene based on disentangled position and direction data. The disclosed embodiments beneficially improve conventional techniques for generating novel viewpoints and/or continuous viewpoints of static scenes.

In particular, the disclosed embodiments facilitate improvements in multi-view consistency and reduces artifacts when compared to conventional techniques. Additionally, the present invention integrates well into the ray tracing and path tracing paradigms by using an implicit function that can be queried at any point, and the systems and methods are free from having to specify an exact bounding volume or geometry at training time.

Embodiments of the present invention may comprise or utilize a special purpose or general-purpose computer (e.g., computing system 110) including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media (e.g., hardware storage device(s) 140 of FIG. 1) that store computer-executable instructions (e.g., computer-executable instructions 118 of FIG. 1) are physical hardware storage media/devices that exclude transmission media. Computer-readable media that carry computer-executable instructions or computer-readable instructions (e.g., computer-executable instructions 118) in one or more carrier waves or signals are transmission media. Thus, by way of example, and not limitation, embodiments of the invention can comprise at least two distinctly different kinds of computer-readable media: physical computer-readable storage media/devices and transmission computer-readable media.

Physical computer-readable storage media/devices are hardware and include RAM, ROM, EEPROM, CD-ROM or other optical disk storage (such as CDs, DVDs, etc.), magnetic disk storage or other magnetic storage devices, or any other hardware which can be used to store desired program code means in the form of computer-executable instructions or data structures and which can be accessed by a general purpose or special purpose computer.

A "network" (e.g., network 130 of FIG. 1) is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry, or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented by a computing system for training a machine learning model to generate color outputs of a static scene, the method comprising:

identifying a three-dimensional static scene;
obtaining a set of training images comprising multiple viewpoints of the three-dimensional static scene;
identifying a plurality of camera rays corresponding to the set of training images;
sampling a set of points along the plurality of camera rays to obtain a positional data and a directional data for each point included in the set of points;
training a first neural network on positional data obtained for each point;
processing the positional data with the first neural network to generate a density value and a plurality of radiance components;
storing the plurality of radiance components as cached radiance components;
training a second neural network on the directional data;
processing the directional data with the second neural network to generate a weighting scheme for a plurality of view directions, the weighting scheme comprising a plurality of weight values to be applied to the plurality of radiance components;
storing the weighting scheme for each view direction included in the plurality of view directions as cached weighting scheme data; and
generating a final color value by combining the cached radiance components according to the cached weighting scheme data associated with a particular view direction.

2. The method of claim 1, further comprising:
performing volume rendering for each point included in a sub-set of points along a camera ray included in the plurality of camera rays based on the density value and final color value included in a cached database; and
collapsing the sub-set of points along the camera ray into a rendered pixel to be included in a two-dimensional image of the static scene.

3. The method of claim 2, further comprising:
comparing the rendered pixel with a corresponding pixel in a training image included in the set of training images; and
minimizing error between the rendered pixel and corresponding pixel in the training image.

4. The method of claim 1, further comprising:
deriving a collision mesh from a volumetric representation of the three-dimensional static scene by computing a sign-distance function based on a volume density for a plurality of points sampled along a camera ray;
identifying a first point included in the plurality of points corresponding to a first hit computed by the collision mesh; and
performing volume rendering by integrating a sub-set of points included in the plurality of points, the sub-set of points corresponding to non-empty space identified by the collision mesh after the first hit.

5. The method of claim 1, further comprising:
prior to deriving a collision mesh from a volumetric representation of the three-dimensional static scene by computing a sign-distance function based on a volume density for a plurality of points sampled along a camera ray, downsizing the volumetric representation of the three-dimensional static scene by a pre-determined factor based on an original volume of the volumetric representation.

6. The method of claim 1, further comprising:
generating a positional encoding for the positional data; and
generating a directional encoding for the directional data.

7. The method of claim 1, wherein the set of training images are 2D and RGB images of the static scene.

8. The method of claim 1, wherein the set of training images further comprises metadata including camera parameters and static scene boundaries.

9. The method of claim 1, wherein the plurality of radiance components and final color value are configured as RGB components.

10. The method of claim 1, wherein the first neural network and second neural network are trained in parallel.

11. The method of claim 1, wherein the density value is equal to or greater than zero and represents an opacity of a particular point in the static scene.

12. A method implemented by a computing system for generating a novel viewpoint of a static scene based on cached directional and positional data obtained for the static scene, the method comprising:
identifying a three-dimensional static scene, wherein a volumetric representation of the three-dimensional static scene is configured as a Neural Radiance Field (NeRF);
identifying a novel viewpoint from which to render a two-dimensional image of the three-dimensional static scene;
accessing a cached database of radiance components for a plurality of points included in the volumetric representation of the three-dimensional static scene;
accessing a cached database of weighting schemes for a plurality of view directions; and
for each point included in the plurality of points, generate a final color value by combining a set of radiance components for each point according to a weighting scheme included in the cached database of weighting schemes corresponding to one or more novel view directions included in the plurality of view directions.

13. The method of claim 12, further comprising:
generating a plurality of rays and a plurality of points along the plurality of rays corresponding to the novel viewpoint.

14. The method of claim 12, further comprising:
performing volume rendering for each point based on the final color value and a corresponding density value.

15. The method of claim 14, further comprising:
generating a novel image of the three-dimensional static scene based on a volume rendering for each point, wherein a plurality of points is collapsed into a plurality of pixels to be included in the novel image of the three-dimensional static scene.

16. A computing system comprising:
one or more processors; and
one or more computer-readable instructions that are executable by the one or more processors to configure the computing system to at least:
identify a three-dimensional static scene;
obtain a set of training images comprising multiple viewpoints of the three-dimensional static scene;
identify a plurality of camera rays corresponding to the set of training images;
sample a set of points along the plurality of camera rays to obtain a positional data and a directional data for each point included in the set of points;
train a first neural network on positional data obtained for each point; process the positional data with the first neural network to generate a density value and a plurality of radiance components;
store the plurality of radiance components as cached radiance components;
train a second neural network on the directional data;
process the directional data with the second neural network to generate a weighting scheme for a plurality of view directions, the weighting scheme comprising a plurality of weight values to be applied to the plurality of radiance components;
store the weighting scheme for each view direction included in the plurality of view directions as cached weighting scheme data; and
generate a final color value by combining the cached radiance components according to the cached weighting scheme data associated with a particular view direction.

17. The computing system of claim 16, the one or more computer-readable instructions being further executable by the one or more processors to further configure the computing system to:
obtain a set of camera parameters corresponding to the plurality of camera rays;
determine a minimum bound and a maximum bound of each camera ray included in the plurality of camera rays based on the set of camera parameters; and
sample the set of points along the plurality of camera rays from the minimum bound to the maximum bound.

18. The computing system of claim 16, wherein the first neural network and second neural network are configured as multi-layer perceptrons.

19. The computing system of claim 16, the one or more computer-readable instructions being further executable by the one or more processors to further configure the computing system to:
perform volume rendering or ray-traced volume rendering for each point included in a sub-set of points along a camera ray included in the plurality of camera rays based on the density value and final color value included in a cached database;
collapsing the sub-set of points along the camera ray into a rendered pixel to be included in a two-dimensional image of the three-dimensional static scene; and
applying the two-dimensional image of the three-dimensional static scene in an augmented virtual reality application.

* * * * *